Patented Mar. 4, 1952

2,588,090

UNITED STATES PATENT OFFICE 2,588,090

PROCESS FOR THE PREPARATION OF BASIC ALUMINUM SALTS OF ALPHA AMINO ACIDS

Geza S. Delmar, Montreal, Quebec, Canada

No Drawing. Application April 14, 1950,
Serial No. 156,041

17 Claims. (Cl. 260—448)

Introduction

The present invention relates to improvements in the preparation of basic aluminum salts having therapeutic properties.

Prior art

Certain basic aluminum salts, for example, dihydroxy aluminum aminoacetate have been found to possess therapeutic properties effective in the relief of excess gastric acidity. This compound has been accepted by the Council of Pharmacy and Chemistry of the American Medical Association to be included in the New and Nonofficial Remedies, vol. 1949, p. 336.

A method of preparing basic aluminum salts of an aliphatic amino acid is disclosed in U. S. Patent 2,480,743. The method comprises dissolving in water an aliphatic amino acid, incorporating into the resulting solution an aluminum alcoholate and separating the resulting precipitate of the basic aluminum salt of the aliphatic amino acid.

This process involves the reaction of an aqueous solution of aminoacetic acid with an aluminum alcoholate and the patent states that it is not possible to prepare the desired basic aluminum salts by reacting the free amino acid with metallic aluminum, aluminum oxide, aluminum hydroxide or other insoluble aluminum compounds. It was not expected that reaction could take place between these compounds in view of the insolubility of one of the reactants and of the basic aluminum salts that would result.

Applicant's development

In contradistinction with the above statement, it has now been found, in accordance with the present invention, that basic aluminum salts can be prepared by reacting a free alpha amino acid dissolved or suspended in water preferably at room temperature with aluminum hydroxide.

It has been found that optimum results are obtained when using aluminum hydroxide which is sufficiently pure and finely divided. The prior art shows that there are different ways of preparing aluminum hydroxide and that its physical properties vary accordingly. For example, freshly precipitated aluminum hydroxide if it is dried will have different properties depending on how it is dried. Such changes are particularly noticed depending on the drying temperature.

The preferred aluminum hydroxide used in accordance with the present invention is one which has been freshly precipitated or dried under proper conditions. It has also been found that commercially available aluminum hydroxide gels can be used.

The aluminum hydroxide gels preferably used in accordance with the present invention are those containing from about 4 to about 50% $Al_2O_3$ and especially those sold on the market under the trade names of "F-500" and "F-1000" by Recheis Company Inc. of Newark, N. J. These gels meet all the USP XIII specifications for dried aluminum hydroxide gels.

All commercially available aluminum hydroxide gels can be used provided they did not lose completely their swelling properties which are inherent to aluminum hydroxide gels.

Such aluminum hydroxide gels are prepared by precipitating a water-soluble aluminum salt with an aqueous solution of an alkali, for example, ammonia, sodium hydroxide, sodium carbonate etc. at about room temperature and a concentration such that the precipitating aluminum hydroxide will retain its swelling properties.

The precipitated aluminum hydroxide is washed with distilled water until free from undesirable impurities, for example, sulfates, chlorides, etc. The thus obtained pure aluminum hydroxide can be used in the reaction without any further purification, or part of the water retained by the fine precipitate of aluminum hydroxide may be removed by centrifuging, pressing, drying or any other known method. However, if the aluminum hydroxide is to be dried it is important to keep the temperature below about 40° C. and not to remove the water completely so as to safeguard the property of swelling and the gel-forming ability of the aluminum hydroxide.

The alpha amino acids which are preferably used in accordance with the present invention may be alpha aliphatic amino acids, for example, mono-carboxylic acids, for example, glycine, alanine or di-carboxylic acids, for example, glutamic acid, or mixtures thereof or a hydrolysate of proteins prepared by enzymatic or chemical processes (either with acids or with alkalies). For example, a casein, a zein or hemoglobin hydrolysate will react the same way as any of the above-mentioned alpha amino acids. When using mixtures of amino acids, the acid titer of the mixture must be first determined to ascertain the quantity of aluminum hydroxide to be used in the reaction.

EXAMPLES

The following examples are illustrative of a preferred process of carrying out the present invention. It should be understood that these examples are not intended to limit the invention and that obvious changes may be made by those skilled in the art without changing the essential characteristics and the basic concept of the invention.

*Example 1*

666.4 gms. of aluminum sulfate

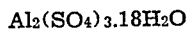

are dissolved in 5000 cc. of water and a diluted ammonia solution is added until all the aluminum hydroxide has been precipitated. The precipitate is filtered and washed with water until the washing gives no reaction of sulfates any more. The aluminum hydroxide is sucked on a Buechner filter and then mixed with 150.1 gms. of glycine.

The aluminum hydroxide which originally formed a gel-like substance liquefies and there is a slight increase in temperature indicating that a reaction took place. Under continued stirring a thin paste results which is put in a dryer to dry at a temperature of 60° to 70° C. The thus obtained product is dihydroxy aluminum aminoacetate.

In the above example the specified quantity of aluminum sulfate may be substituted by 482.86 gms. of aluminum chloride $AlCl_3.6H_2O$ or the molecular equivalent of any other water soluble aluminum salt.

*Example 2*

102 gms. of a commercially available aluminum hydroxide U. S. P. having swelling properties and containing 50% of $Al_2O_3$ are thoroughly mixed with an aqueous solution containing 75 gms. of glycine.

The reaction takes the same course as in Example 1. The reaction product is worked up the same way and the resulting product is the same.

In the above examples glycine may be substituted by a molecular equivalent of alanine (aminopropionic acid) to obtain the corresponding dihydroxy aluminum aminopropionate.

Also for each mol. of glycine a half mol. of glutamic acid (considering that glutamic acid is a dicarboxylic acid) may be substituted to obtain by the same process tetrahydroxy dialuminum glutamate.

By reacting aluminum hydroxide of the same quality with sodium acid glutamate in the proper molecular proportions, dihydroxy aluminum sodium glutamate may be prepared. Similarly, magnesium diglutamate will yield by the same process a mixed basic aluminum-magnesium glutamate, the tetrahydroxy dialuminum magnesium diglutamate, the formula of which may be represented as follows:

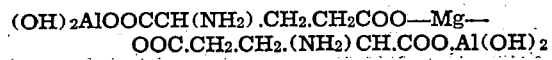

I claim:

1. As a new compound, the tetrahydroxy dialuminum glutamate.

2. As a new compound, the dihydroxy aluminum sodium glutamate.

3. As a new compound, the tetrahydroxy dialuminum magnesium diglutamate.

4. Basic disubstituted salts of glutamic acid in which at least one of its substituents is aluminum.

5. Basic disubstituted salts of glutamic acid in which one of the substituents is selected from the group consisting of aluminum, sodium and magnesium and the other substituent is aluminum.

6. A process for the preparation of basic aluminum salts, comprising reacting a pure and finely divided aluminum hydroxide gel possessing swelling properties with at least one alpha-amino acid in the presence of water to form a paste of the desired basic aluminum salt, and drying said paste.

7. A process according to claim 6, in which the alpha-amino acid is an alpha mono-carboxylic acid.

8. A process according to claim 7, in which the alpha mono-carboxylic acid is amino acetic acid.

9. A process according to claim 7, in which the alpha mono-carboxylic acid is alpha-amino propionic acid.

10. A process according to claim 6, in which the alpha amino acid is an alpha amino di-carboxylic acid.

11. A process according to claim 10, in which the alpha amino di-carboxylic acid is glutamic acid.

12. A process according to claim 11, in which the glutamic acid is monosodium glutamate.

13. A process according to claim 11, in which the glutamic acid is magnesium diglutamate.

14. A process according to claim 6, in which the alpha amino acid is a mixture of aliphatic alpha amino acids.

15. A process according to claim 14, in which the mixture of alpha amino acids consists of amino acetic acid and glutamic acid.

16. A process according to claim 6, in which the alpha amino acid is a hydrolysate of proteins.

17. A process according to claim 6, in which the alpha amino acid is a mixture of an aliphatic alpha amino acid and a hydrolysate of protein.

GEZA S. DELMAR.

REFERENCES CITED

The following references are of record in the file of this patent:

UNITED STATES PATENTS

| Number | Name | Date |
|---|---|---|
| 1,447,501 | Altwegg | Mar. 6, 1923 |
| 2,446,981 | Ninger | Aug. 10, 1948 |
| 2,480,743 | Krantz et al. | Aug. 30, 1949 |